Dec. 2, 1952     O. C. NIEDERER ET AL     2,620,059
EGG FEEDING DEVICE
Filed Jan. 28, 1947                        2 SHEETS—SHEET 1
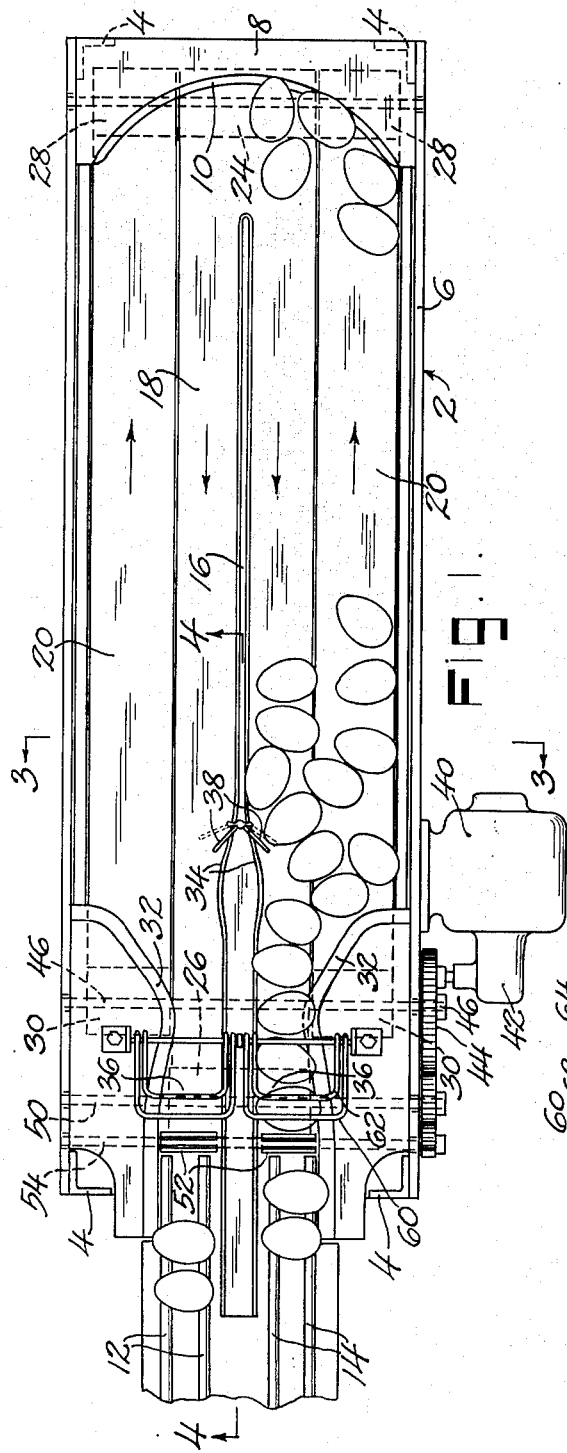
INVENTORS
OTTO C. NIEDERER
HERBERT O. NIEDERER
BY OTTO NIEDERER
Albert Sperry.
ATTORNEY Dec. 2, 1952   O. C. NIEDERER ET AL   2,620,059
EGG FEEDING DEVICE Filed Jan. 28, 1947                         2 SHEETS—SHEET 2

INVENTORS
OTTO C. NIEDERER
HERBERT O. NIEDERER
BY OTTO NIEDERER

Albert Sperry
ATTORNEY

Patented Dec. 2, 1952

2,620,059

UNITED STATES PATENT OFFICE 2,620,059

EGG FEEDING DEVICE

Otto C. Niederer, Herbert O. Niederer, and Otto Niederer, Titusville, N. J.

Application January 28, 1947, Serial No. 724,868

11 Claims. (Cl. 198—30)

Our invention relates to mechanism for arranging and feeding eggs so that they can be supplied continuously and in an orderly manner to a predetermined point such as the egg receiving channel of an egg grader and candler or other egg handling device.

Many types of egg grading and candling devices and similar mechanism require eggs to be supplied thereto in a continuous prearranged and orderly manner. For this purpose such devices generally have inclined tracks, chutes or egg receiving channels to which eggs are supplied and along which they roll or are passed to other elements of the device. However, the operation of supplying eggs to such channels presents many difficulties due to the fact that eggs must be handled gently and cannot be pushed, crowded or permitted to tumble or to bump very hard against each other without danger of breakage. Moreover, the irregular shape of eggs and the differences in size encountered cause eggs to move irregularly and in different directions when they are allowed to roll freely over a surface. For these reasons conventional article feeding devices cannot be used to supply eggs to egg candling or grading devices and similar mechanism. It has been usual instead to employ an operator who removes the eggs from a crate, bucket or other source of supply and places them by hand on the tracks or channels of the egg handling mechanism. Such manual handling of eggs is expensive and tedious, and results in an irregular supply of the eggs to the mechanism, particularly when one operator is required to maintain a supply of eggs for two or more machines, or is interrupted in his work to open or move other crates of eggs so that they may be transferred to the channels.

In accordance with our invention mechanism is provided which serves to move and arrange eggs quickly and safely and in such a manner that they may be fed continuously and regularly to egg grading and candling devices or other mechanism. This is accomplished by yieldably advancing the eggs toward egg-arranging means or discharging means while at the same time surplus eggs are moved away from such means so as to prevent crowding, clogging or crushing of the eggs. The surplus eggs thus removed are returned for re-supply to the egg advancing means, whereby they are again presented to the arranging or discharge means.

One of the objects of our invention is to provide novel means for feeding eggs to egg handling mechanism.

Another object of our invention is to insure a substantially continuous supply of eggs to egg handling mechanism, while avoiding breakage or injury to the eggs.

A further object of our invention is to provide improved egg feeding means which serve to arrange eggs in an orderly manner for discharge therefrom.

A particular object of our invention is to provide egg feeding means capable of handling a relatively large volume of eggs so as to feed them continuously, rapidly and in an orderly manner to egg grading or egg candling devices.

These and other objects and features of our invention will appear from the following description thereof in which reference is made to the figures of the accompanying drawings.

In the drawings:

Fig. 1 is a top plan view of a preferred form of mechanism embodying our invention;

Fig. 2 is a side elevation of the construction illustrated in Fig. 1;

Figure 3:
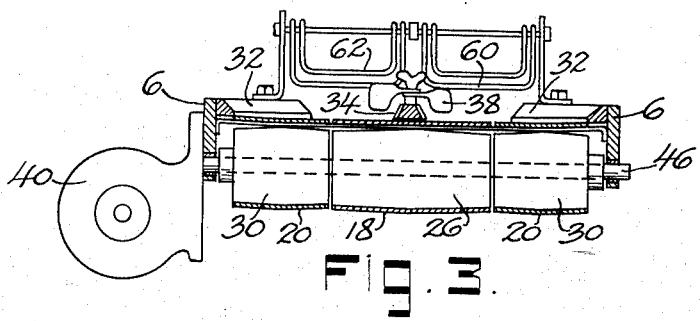
Fig. 3 is a vertical sectional view taken on the line 3—3 of Fig. 1.

In that form of our invention illustrated in Figs. 1 to 4 the feeding mechanism embodies a tray or platform 2 mounted on supports 4 and provided at its opposite sides with rails 6 for preventing the eggs from rolling off the sides of the platform. The platform is preferably inclined at a slight angle not exceeding about 5°. Its outer or upper end 8 is provided with a guide rail presenting a curved inner surface 10 for directing eggs inward toward the center of the platform when they are moved into contact therewith. The opposite, lower or discharge end of the platform 2 is located adjacent an egg receiving channel of an egg handling device (not shown).

The construction shown in Figs. 1 to 4 is adapted to supply eggs to two egg receiving channels 12 and 14 such as the channels employed in the egg candling and grading device illustrated in Fig. 6 of the patent to Niederer et al. No. 2,246,597. The channels 12 and 14 each consist of a pair of tracks which support the eggs with their axes arranged parallel and transverse to the tracks. The eggs roll along the tracks of the egg receiving channels as they are discharged from the lower end of the platform and are thus supplied to the egg handling device.

The platform 2 is provided with a central divider 16 which extends longitudinally of the platform and separates the eggs passing to the channel 12 from those passing to channel 14. However, the upper end of the divider 16 may be spaced from the upper guide rail 8 so as to permit eggs from one side of the platform to pass over to the other side when eggs are discharged to one of the channels 12 or 14 faster than to the other.

Each side of the platform 2 is provided with an egg advancing belt 18 and a surplus egg removing belt 20. When the feeding mechanism discharges to two channels as shown in Figs. 1 and 3, the belt 18 may extend beneath the central divider 16 so that a single belt 18 serves both sides of the platform, whereas separate belts 20 are located adjacent the opposite edges of the belt 18. Further, as shown in Fig. 3, the outer edges of the platform are slightly inclined so that the belts 20 present a gentle transverse slope toward belt 18 and tend to cause the eggs to roll inward so that they may be transferred from the egg removing belts 20 to the egg advancing belt 18. The belt 18 passes about an idler pulley 24 at the upper end of the platform 2 and about a driven pulley 26 adjacent the lower end of the platform. The belt 20 extends about an idler pulley 28 adjacent the upper end of the platform and about the driven pulley 30 adjacent the lower end thereof. The lower run of each of the belts 18 and 20 is located below the platform 2, as indicated in Figs. 2 and 3.

The lower discharge end of the platform 2 is provided with egg deflecting rails 32 which extend inward from the sides of the platform and over the egg removing belts 20 toward the egg advancing belt 18. The rails 32 are shaped and inclined to cooperate with deflecting surfaces 34 on the lower portion of the central divider 16 so as to define egg directing passages 36 which are aligned with the egg advancing belt 18 and the egg receiving channels 12 and 14. The passages 36 are only slightly greater in width than the length of the eggs. The deflecting surfaces thus serve to cause eggs carried by the egg advancing belt 18 to be arranged in single file to move through the passages 36 to the egg receiving channels. Additional deflecting means in the form of yieldable fingers 38 are sometimes mounted on the lower portion of the central divider 16 to prevent more than one egg at a time being carried into the throat of the passages 36. However, these deflecting means are seldom used except when grading pullet eggs or other relatively small eggs which may travel side by side on the egg advancing belt.

The belts 18 and 20 are driven by a motor 40 and reduction gear 42. For this purpose a gear 44 is secured to shaft 46 for driving the pulley 30 and a gear 48 is secured to shaft 50 for driving pulley 26 in a direction opposite to that in which pulley 30 rotates. In this way the upper run of belt 18 which overlies the platform 2 is caused to travel continuously toward the lower discharge end of the platform so that eggs resting thereon will be carried into passages 36 and toward the egg receiving channels 12 and 14 for discharge from the machine. At the same time the belts 20 adjacent belt 18 are moved in the opposite direction to carry excess eggs away from the passages 36. Since the eggs can shift and move on the surface of the belt 18 they are yieldably fed into the passages 36 until these passages are filled. Thereafter the excess eggs shift and roll laterally onto the egg removing belts 20 and are carried back up the platform 2 to be returned to the relatively uncrowded upper portion of the egg advancing belt. Those eggs which are carried all the way to the upper end of the platform 2 by belts 20 are directed inward by the curved surface 19 of the end rail 8 to the egg advancing belt 18 so that they will again be carried toward the lower end of the platform and toward the passages 36 and egg receiving channels 12 and 14. In those constructions wherein the upper end of the central divider is spaced from the curved surface 19 at the upper end of the platform, excess eggs accummulating on one side of the platform may be shifted over to the other side of the platform about the upper end of the divider. In this way different rates of discharge of the eggs through passage 36 and egg receiving channels 12 and 14 may occur without producing too great an accumulation of eggs on either side of the platform.

The belt 18 preferably is caused to travel slightly faster than the belt 20 so that eggs are carried toward the passages 36 at the lower end of the platform more rapidly than the surplus eggs are moved away from the lower end of the platform. In this way a continuous supply of eggs is maintained adjacent the lower end of the platform and they are yieldably urged into the passages 36, but there is no danger of crowding or jamming of the eggs which might crush them or cause injury thereto.

The eggs moving through passages 36 ordinarily assume positions in which their axes are parallel and extend transversely of the passage. However, in order to assure such positioning of the eggs and cause those eggs with their axes inclined to each other to shift into parallel positions as they pass through the channel, egg positioning means are generally employed. In the construction shown, the positioning means embodies an element located in passage 36 and extending transversely of the passage. If desired the positioning means may present one or more projections or ribs which extend transversely of the passage to engage the eggs while they are yieldably urged against the projection by belt 18. The egg positioning means is preferably rotatable so as to present a surface engageable by the eggs which is positively moved in a direction toward the egg receiving channel. The eggs then tend to turn to bring the axes thereof parallel to each other.

Figure 4:
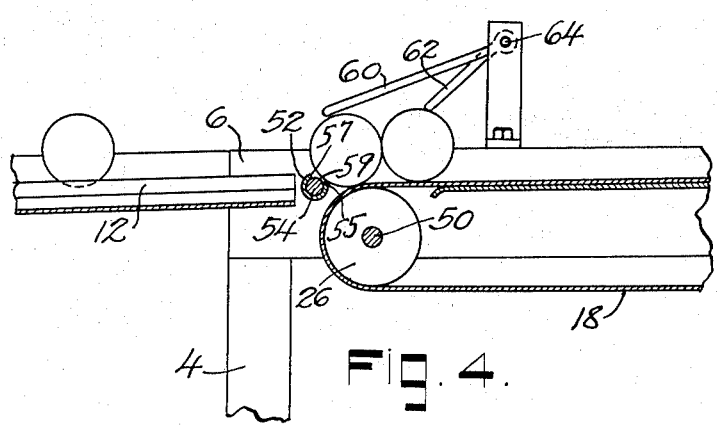
Fig. 4 is a longitudinal sectional view taken on the line 4—4 of Fig. 1.

The positioning means illustrated is in the form of a rubber collar 52 mounted on the shaft 54 and rotated by the gear 56 through an idler 58 from the gear 48. In this way the positioning element 52 is caused to rotate in a counterclockwise direction as seen in Fig. 4 to engage and slightly raise an egg in contact therewith while the egg is being urged forward by the belt 18 and the succeeding eggs in the passage 36. If the egg is in an inclined position when it engages the positioning element it will automatically shift and rotate until its axis is substantially parallel with the shaft 54.

As shown particularly in Fig. 4 the collar 52 may be split so as to present projecting edges 55 and 57 on opposite sides of a recess 59 which extends longitudinally of the shaft 54 and transversely of the channel 36. These edges and recess on the collar further aid in shifting and turning the eggs to arrange their axes parallel and transverse to channel 36.

In some instances pressing members 60 and 62 are employed in combination with the positioning element 52 to cause eggs to be urged toward the element and into the recess 59 between the projection edges 55 and 57 of the split collar so as to insure turning the eggs into transverse positions in passage 36. The pressing elements 60 and 62 preferably are in form of U-shaped bars pivotally mounted on the shaft 64 and present parallel egg engaging portions which bear against the egg in contact with the positioning element. The bars thus retard forward movement of the forwardmost portion of the egg and cause it to straighten out into the desired transverse position. The positioning element 52, as it rotates, also serves to raise the eggs lightly so that they pass readily onto the parallel tracks of the egg receiving channels 12 and 14. When thus positioned and fed to the egg receiving channels, the eggs pass on to the egg candler or grader or other egg handling device with which the feeding mechanism is used.

The construction described operates very effectively and smoothly to cause eggs to be arranged and moved continuously and in an orderly manner to the egg handling device. Crowding and jamming of the eggs is avoided, even though they differ materially in shape and size, whereas excess eggs are removed from adjacent the throat of the passages 36 so as to prevent crowding, jamming or rough treatment of the eggs at any time. Furthermore, when the egg feeding mechanism is used to advance eggs to two supply means, the accumulation of eggs on one side of the central rail will cause the excess eggs to be deflected to the opposite side of the device.

In practice the construction shown is designed for use with conventional egg lifting devices by which a whole tray of eggs from a crate may be raised and deposited on the platform of the egg feeding mechanism. One-half of the eggs thus removed from a crate will then be deposited on one side of the central rail 16, while the other half of the eggs will be deposited on the other side of the central rail. An operator can then place three dozen eggs on the platform in a single operation, and without employing special care in positioning the eggs to be fed to the supply means. A single operator can then handle the needs of four or six machines very easily, whereas each machine will be assured of a continuous and automatic supply of eggs to be handled.

Figure 5:
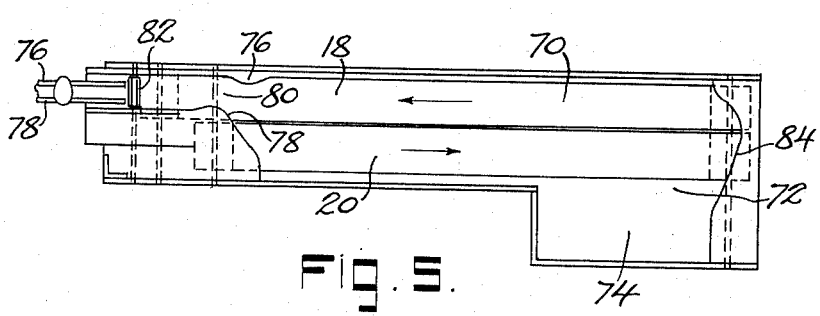
Fig. 5 is a top plan view of an alternative form of mechanism embodying our invention.

In the construction illustrated in Fig. 5, a single egg supply means 70 is provided, and the platform 72 is formed with an extension 74 that is inclined toward the egg returning belt 20 of the assembly. The egg advancing belt 18 serves to move the eggs along the platform to the inclined rails 76 and 78 which define a passage 80 and to the egg positioning element 82. With this construction conventional egg lifting devices may be employed to place a full tray of eggs on the platform, and its extension 74 whereupon the eggs on the extension will roll inward to be carried by the belt 18 toward the lower end of the platform. At the same time the belt 20 will serve to move the eggs from the platform to the deflecting surface 84 and thence to the feeding belt 18. As in the construction shown in Figs. 1 to 4, the belt 20 serves to move excess eggs away from the inclined portions 76 and 78 of the rails to prevent crowding or jamming of the eggs as they pass to the egg arranging element supply means.

While we have shown and described typical embodiments of our invention, it will be apparent that numerous changes may be made in the form, construction and arrangement of the elements employed, and in view thereof it should be understood that the form of our invention shown in the drawings is intended to be illustrative only and is not intended to limit the scope of our invention.

We claim:

1. Egg feeding mechanism comprising an inclined platform having a pair of egg moving belts supported on the upper surface thereof, means for moving one of said belts toward the lower portion of said platform, means for moving the other belt away from the lower portion of said platform, the latter belt being inclined transversely of the platform so that eggs thereon tend to roll transversely onto the belt which is advancing the eggs, an egg receiving channel located adjacent said lower portion of the platform, deflecting means located on opposite sides of the belt which is movable toward the lower end of the platform and serving to define a passage not substantially greater in width than the length of the eggs being fed and extending from said platform to said channel, and means in said passage engageable by eggs passing therethrough and positioned to raise each egg slightly so as to allow the egg to turn where necessary whereby said eggs are arranged with their axes substantially parallel.

2. Egg feeding mechanism comprising an inclined platform having a pair of egg moving belts supported on the upper surface thereof with their adjacent edges located so that said belts cooperate to present a substantially continuous surface in position to receive the eggs to be fed, means for moving one of said belts toward the lower end of said platform, means for moving the other belt away from the lower end of said platform, the latter belt being inclined transversely of the platform so that eggs thereon tend to roll transversely onto the belt which is advancing the eggs, an egg receiving channel located adjacent said lower end of the platform, deflecting means located on opposite sides of the belt which is movable toward the lower end of the platform and serving to define a passage not substantially greater in width than the length of the eggs being fed and extending from the lower end of said platform to said channel, and means in said passage for arranging eggs passing therethrough with their axes substantially parallel.

3. Egg feeding mechanism comprising an inclined platform having a pair of egg moving belts supported on the upper surface thereof with their adjacent edges located so that said belts cooperate to present a substantially continuous surface in position to receive the eggs to be fed, means for moving one of said belts toward the lower end of said platform, means for moving the other belt away from the lower end of said platform, the latter belt being inclined transversely of the platform so that eggs thereon tend to roll transversely onto the belt which is advancing the eggs, an egg receiving channel located adjacent said lower end of the platform, deflecting means located on opposite sides of the belt which is movable toward the lower end of the platform and serving to define a passage not substantially greater in width than the length of the eggs being fed and extending from the lower end of said platform to said channel, an element engageable by eggs in said passage and having a projection thereon extending transversely of said channel, and means for rotating said element to cause said projection to engage eggs in the passage and to cause them to assume positions in which their long axes are substantially parallel.

4. Mechanism for feeding eggs to an egg handling device comprising a pair of parallel belts having their adjacent edges located so that the belts cooperate to present a substantially continuous surface in position to receive the eggs to be fed, an egg receiving channel, means for moving one of said belts toward said channel, means for moving the other belt away from said channel, and means located on opposite sides of the belt which is movable toward said channel and serving to define a passage not substantially greater in width than the length of the eggs to be fed and extending from said belt to said channel, the belt which is movable away from said channel being transversely inclined so that eggs thereon will tend to roll toward the belt which is movable toward said channel.

5. Mechanism of the character defined in claim 4 wherein the belt which is movable toward said channel is caused to travel faster than the belt which is movable away from said channel.

6. Mechanism of the character defined in claim 5 wherein means are located in position to engage eggs in said passage to arrange said eggs with their axes substantially parallel and extending transversely of the passage.

7. Egg feeding mechanism comprising a pair of parallel belts positioned with their edges closely adjacent and presenting upper faces which cooperate to define a substantially flat surface over which eggs may be rolled freely from one belt to the other, said surface being of sufficient area to receive a group of eggs to be sorted, means forming a rim extending about said surface to hold eggs thereon an egg receiving channel in alignment with one of said belts, means for moving the latter belt in a direction toward said channel, means for moving the other belt in a direction away from said channel whereby excess eggs moved toward said channel may roll onto the other belt and be carried away from the channel by said other belt means defining an egg directing passage in alignment with said latter belt and said channel, and means in said passage engageable by eggs passing therethrough and formed to raise each egg slightly so as to allow the egg to turn when necessary whereby eggs moving through said passage will be arranged with their axes parallel.

8. Mechanism of the character defined in claim 7 wherein a deflector is located in advance of said channel and projects over the belt which advances the eggs so as to prevent more than one egg at a time from being directed into said channel from the egg advancing belt.

9. Egg feeding mechanism comprising a pair of parallel belts positioned with their edges closely adjacent and presenting upper faces which cooperate to define a substantially flat surface over which eggs may be rolled freely from one belt to the other, said surface being of sufficient area to receive a group of eggs to be sorted, means forming a rim extending about said surface to hold eggs thereon an egg receiving channel including a pair of parallel tracks positioned in alignment with one of said belts, means for moving the latter belt at a predetermined speed and in a direction toward said channel, means for moving the other belt in a direction away from said channel whereby excess eggs moved toward said channel may roll onto the other belt and be carried away from the channel by said other belt means defining an egg directing passage at least part of which overlies said latter belt and extending from said latter belt to said tracks and means in said passage for raising each egg slightly during its movement through said passage to allow the egg to turn when necessary as it is urged onward by said belt and succeeding eggs in the passage for delivery of the eggs to said tracks with their axes arranged parallel and transverse to the tracks.

10. Mechanism of the type defined in claim 7 wherein the egg receiving surface is inclined toward said channel.

11. Mechanism of the type defined in claim 7 wherein the belt which carries excess eggs away from said channel is inclined transversely so that eggs tend to roll therefrom onto the belt which is moving toward the receiving channel.

OTTO C. NIEDERER.
HERBERT O. NIEDERER.
OTTO NIEDERER.

REFERENCES CITED

The following references are of record in the file of this patent:

UNITED STATES PATENTS

| Number | Name | Date |
|---|---|---|
| 290,715 | Steiner | Dec. 25, 1883 |
| 398,651 | Peters | Feb. 26, 1889 |
| 882,795 | Paul | Mar. 24, 1908 |
| 952,352 | Pieper | Mar. 15, 1910 |
| 1,015,319 | Jefferies et al. | Jan. 23, 1912 |
| 1,754,047 | Reaves | Apr. 8, 1930 |
| 2,003,097 | Vickery | May 28, 1935 |
| 2,198,594 | Mundy | Apr. 30, 1940 |
| 2,242,531 | Marx | May 20, 1941 |
| 2,303,755 | Newton | Dec. 1, 1942 |
| 2,404,232 | Hunter | July 16, 1946 |